(No Model.) 3 Sheets—Sheet 3.

S. H. SHORT.
ELECTRIC LOCOMOTIVE.

No. 463,356. Patented Nov. 17, 1891.

Witnesses
C. J. Nottingham
S. G. Nottingham

Inventor
Sidney H. Short.
By H. A. Simpson
Attorney

UNITED STATES PATENT OFFICE.

SIDNEY H. SHORT, OF CLEVELAND, OHIO.

ELECTRIC LOCOMOTIVE.

SPECIFICATION forming part of Letters Patent No. 463,356, dated November 17, 1891.

Application filed April 8, 1891. Serial No. 388,181. (No model.)

*To all whom it may concern:*

Be it known that I, SIDNEY H. SHORT, a resident of Cleveland, in the county of Cuyahoga and State of Ohio, have invented certain new and useful Improvements in Electric Locomotives; and I do hereby declare the following to be a full, clear, and exact description of the invention, such as will enable others skilled in the art to which it appertains to make and use the same.

My invention relates to an improvement in electric locomotives, and more particularly to the means for mounting the motor on the truck and connecting it with the car-axles, the object of the invention being to mount the motor on the trucks in such manner that it can be geared with both axles.

A further object is to so mount the motor on the truck and connect it with the axles, that perfect flexibility of the truck and car gearing relatively to each other will be afforded.

A further object is to connect an electric motor with the car-axles in such manner that the gearing shall be insulated from the axles.

A further object is to so connect the motor to the car-axles that a comparative slow rate of speed of the motor will be necessary.

With these objects in view the invention consists in certain novel features of construction and combinations of parts, as will be hereinafter described, and pointed out in the claims.

Figure 1:
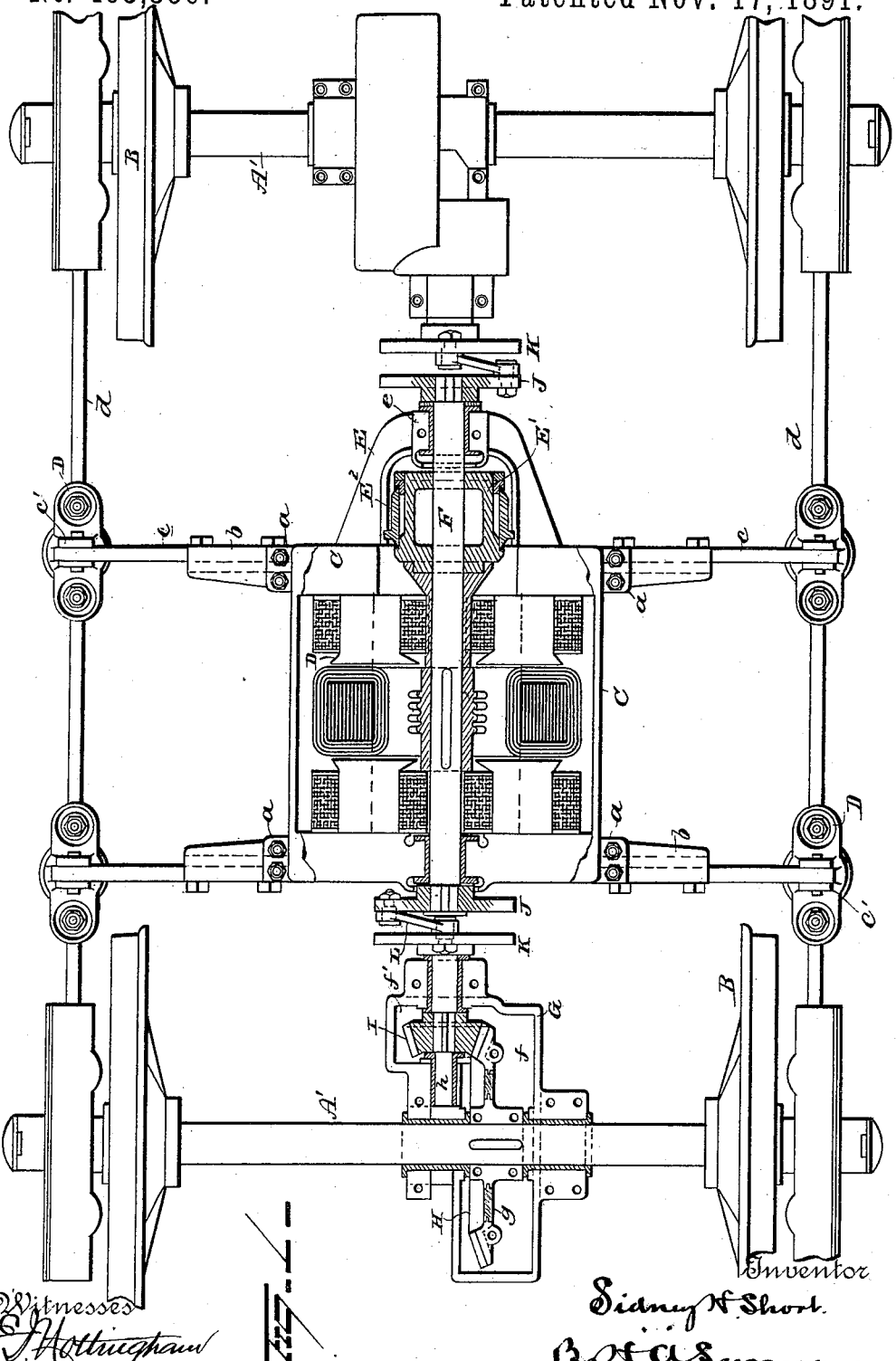
Figure 2:
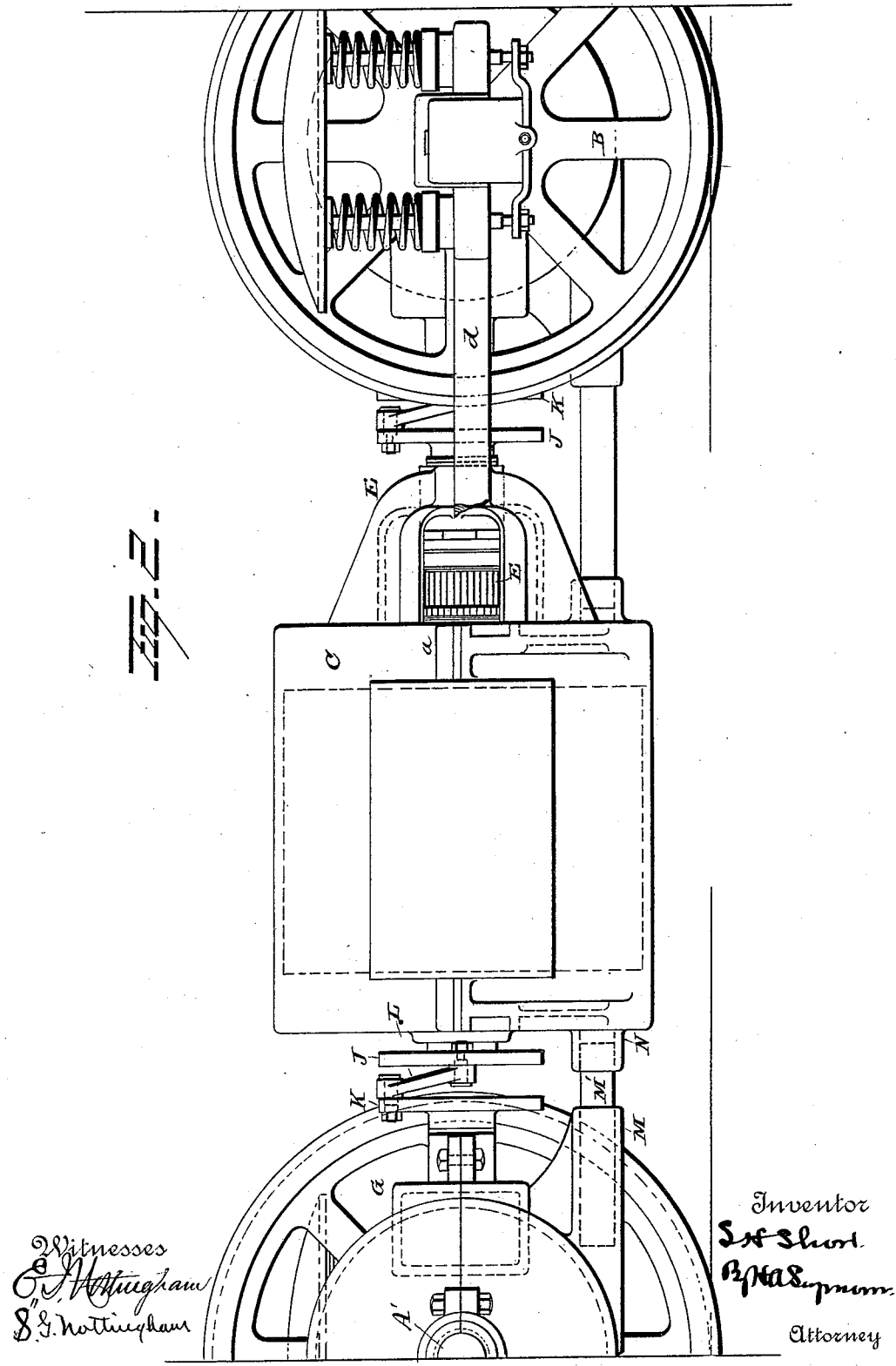
Figure 3:
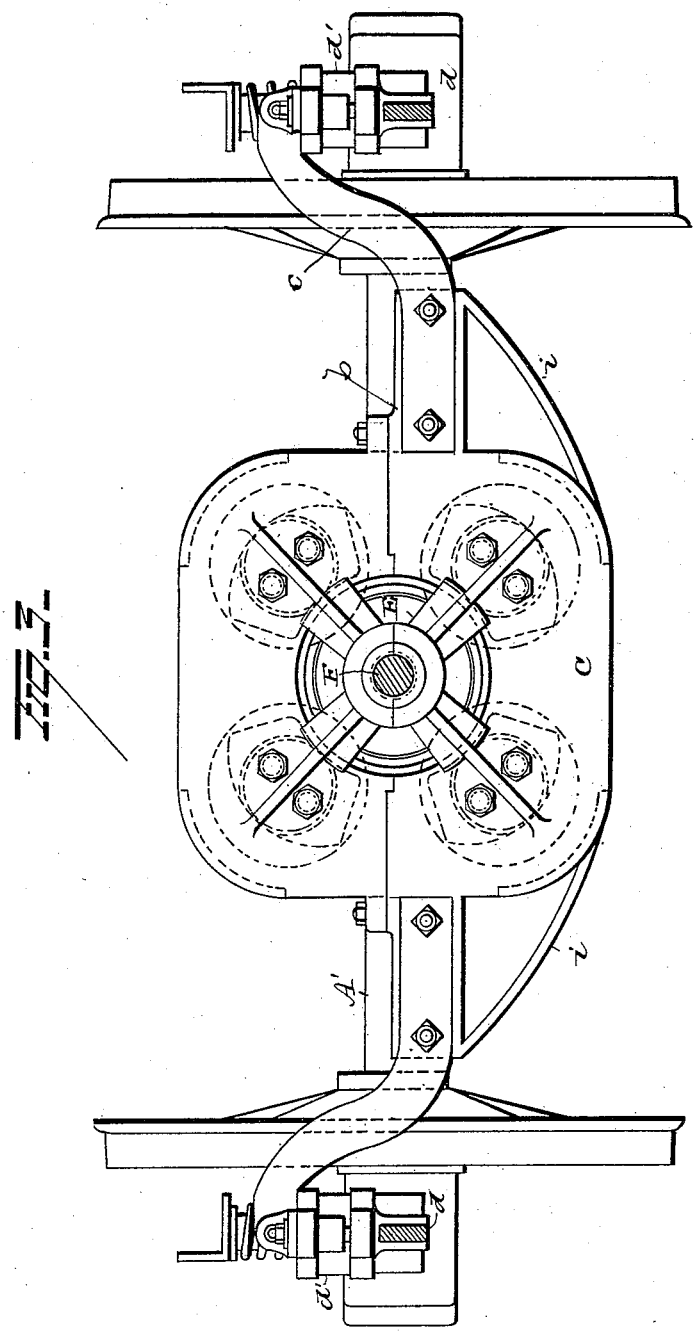

In the accompanying drawings, Figure 1 is a plan view of my invention, partly in section. Fig. 2 is a view on the line $xx$ of Fig. 1. Fig. 3 is a view on the line $yy$ of Fig. 1.

A A' represent two axles, suitably mounted in the car-truck and carrying wheels B. Located between the two axles is a frame or box C for the reception of an electric motor D, said motor preferably being of the style shown in the drawings, in which the field-magnets are held stationary in the box or frame C and the armature made to revolve, although it is evident that the reverse of this arrangement may be adopted. Projecting from the sides of the frame or box C are ears or lugs $a$, to which laterally-projecting arms $b$ are securely bolted. To the arms $b$ supporting-bars $c$ are securely bolted, the outer ends of said bars being pivotally connected between lugs $c'$, projecting from suitable brackets D. The brackets D are connected with the side bars $d$ of the truck, and interposed between said brackets and the side bars are elastic cushions $d'$. It is evident that the bars $b$ may, if desired, be extended and connected with the brackets D and the bars $c$ dispensed with.

Projecting from one end of the frame or box C is a yoke E for the accommodation of a commutator E' and commutator-brushes $E^2$ of the motor. The end of the yoke E is made with a perforated boss $e$, in which one end of a shaft F is mounted, the other end of said shaft being mounted in the other end of the frame. The shaft F passes through the motor and is secured to and carries the rotary armature of the motor and the commutator E'.

Mounted loosely on the axles A A' are casings or boxes G, each of said boxes or casings comprising two compartments $f f'$, the compartment $f'$ being disposed at an angle to the compartment $f$, and the compartment $f'$ of one casing or box G is arranged at the opposite side of the compartment $f$ from the compartment $f'$ of the other box. Keyed to the axles A A' within the compartments $f$ of the boxes G are gear-wheels H, said gears being provided with wooden or other non-conducting webs $g$, whereby the mechanism from which the gears derive their motion will be effectually insulated from the axles.

Mounted in the casings or boxes G, and adapted to pass through the compartments $f'$ thereof, are short shafts $h$, to which bevel-pinions I are keyed, said pinions being adapted to rotate within the compartments $f'$ and mesh with the bevel-gears H. The inner end of each shaft $h$ is provided with a rigidly-fixed disk K, and secured to the ends of the shaft F are similar disks J. The disks J and K are pivotally connected together by means of links L, one end of each link being connected to a disk J in proximity to its periphery, and the other end of said link being connected to a disk K, in proximity to its periphery. In lieu of the disks J K, crank-arms may be employed, if desired. By thus constructing and arranging the mechanism it will be seen that when the shaft F of the motor is rotated, motion will be transmitted to both axles through the medium of the disks J K, shafts $h$, and gears H I. It will also be seen that as the gearing on one box or casing G is oppositely disposed to that in the other, the rotation of the shaft F will drive both axles in the same direction.

In order to effectually prevent the boxes or casings G from rotating with the axles, each box or casing is provided with a socketed projection M, into which a rod or bar M' is inserted, the other end of said rod or bar being adapted to enter a socketed boss N, projecting from the motor-frame C. The motor-frame C is preferably braced by means of arms $i$, extending from said frame to the ends of the arms $b$.

By constructing and arranging the motor on the truck and connecting it by gearing with the axles, as above set forth, an adequate amount of flexibility will be attained between said truck and the gearing, whereby the wear and tear on the parts will be reduced to a minimum, and by arranging the gearing with relation to the motor and axles, as above explained, it will not be necessary to run the motor at a high rate of speed, as sufficient speed of the axles will be attained by operating the motor at a comparatively low rate of speed.

Numerous slight changes might be made in the details of construction of my invention without departing from the spirit of my invention. Hence I do not wish to limit myself to the precise details of construction herein set forth; but, Having fully described my invention, what I claim as new, and desire to secure by Letters Patent, is—

1. The combination, with a car-truck, driving-axles, wheels, and an electric motor, the latter being carried by a frame yieldingly supported on the car-truck, of bevel-gearing connected with each axle and insulated therefrom, and casings mounted on the axles for supporting and protecting the bevel-gearing, and flexible connections between each end of the motor-shaft and the shafts of the bevel-gearing, substantially as set forth.

2. The combination, with a car-truck, axles, and wheels, of an electric motor arranged at right angles to said axles, a shaft carried by a rotating part of said motor, crank-disks at the ends of said shaft, gearing connected with the axles, disks carried by said gearing in proximity to the disks on the shaft, and links pivotally connecting the disks at the ends of the shaft with the disks carried by the gearing, substantially as set forth.

3. The combination, with a car-truck and axles, of a frame located between said axles, supporting-bars projecting laterally from said frame, brackets yieldingly connecting said bars with the side bars of the truck, an electric motor carried by said frame, and gearing connecting said motor with the axles, substantially as set forth.

4. The combination, with a car-truck, axles, and wheels, of a frame located between said axles and yieldingly supported on the side bars of the truck, a yoke projecting from said frame, a motor located in the frame, a shaft passing through said motor and carrying a movable part thereof, one end of said shaft being mounted in the frame and the other end on the yoke, and gearing connecting both ends of the shaft with the axles of the truck, substantially as set forth.

5. The combination, with a car-truck, axles, and wheels, of an electric motor supported by the truck and between the axles, a revoluble shaft carried by said motor, a crank-disk at each end of said shaft, boxes mounted on and carried by the axles, a gear-wheel on each axle with said boxes, a bevel-pinion carried by a shaft mounted in each box and adapted to mesh with said gear-wheels, a crank-disk carried by the inner end of each of said shafts, and links connecting said disks with the disks on the main shaft, substantially as set forth.

6. The combination, with a car-truck, axles, and wheels, of a frame carried by said truck between the axles, a motor carried by said frame, a shaft carried by said motor, boxes mounted on the axles, socketed projections on said boxes, socketed projections on the main frame and bars connecting said socketed projections, and gearing in said boxes connecting the axles with the motors, substantially as set forth.

In testimony whereof I have signed this specification in the presence of two subscribing witnesses.

SIDNEY H. SHORT.

Witnesses:
JOHN C. DOLPH,
A. B. CALHOUN.